United States Patent [19]

Hitomi et al.

[11] Patent Number: 4,738,233
[45] Date of Patent: Apr. 19, 1988

[54] INTAKE SYSTEM FOR INTERNAL COMBUSTION ENGINES

[75] Inventors: Mitsuo Hitomi; Syunki Okazaki; Koji Onishi; Junso Sasaki; Kazunori Tominaga, all of Hiroshima, Japan

[73] Assignee: Mazda Motor Corporation, Hiroshima, Japan

[21] Appl. No.: 832,409

[22] Filed: Feb. 24, 1986

[30] Foreign Application Priority Data

Feb. 25, 1985 [JP] Japan .................................. 60-34531
Oct. 4, 1985 [JP] Japan ................................. 60-221651
Oct. 9, 1985 [JP] Japan ................................. 60-225513

[51] Int. Cl.$^4$ .............................................. F02B 29/00
[52] U.S. Cl. ......................... 123/190 A; 123/52 MB; 123/432
[58] Field of Search ............... 123/52 M, 52 MB, 432, 123/190 A

[56] References Cited

U.S. PATENT DOCUMENTS

| | | | |
|---|---|---|---|
| 4,426,985 | 1/1984 | Kanesaka | 123/564 |
| 4,473,038 | 9/1984 | Lorenzo | 123/52 M |
| 4,554,890 | 11/1985 | Okimoto et al. | 123/190 A |
| 4,622,931 | 11/1986 | Wickramasuriya | 123/190 A |

FOREIGN PATENT DOCUMENTS

| | | |
|---|---|---|
| 141165 | 5/1985 | European Pat. Off. . |
| 3138243 | 6/1982 | Fed. Rep. of Germany . |
| 3520705 | 12/1985 | Fed. Rep. of Germany . |
| 55-107018 | 8/1980 | Japan . |
| 133448 | 8/1983 | Japan .............................. 123/190 A |
| 177862 | 9/1935 | Switzerland . |
| 2160264 | 12/1985 | United Kingdom . |

Primary Examiner—Craig R. Feinberg
Assistant Examiner—David A. Okonsky
Attorney, Agent, or Firm—Fleit, Jacobson, Cohn & Price

[57] ABSTRACT

An engine intake system including an intake passage opening to the combustion chamber through an intake port having an intake valve. A control valve is provided in the intake valve for cyclically opening the intake passage. Upstream the control valve, the intake passage is provided with a tank which functions to reverse the negative pressure propagated from the control valve into a positive pressure which is then transmitted to the combustion chamber to increase the intake charge. A timing control mechanism is provided for retarding the opening timing of the control valve in a low speed, high load engine operation.

11 Claims, 8 Drawing Sheets

- ▼ $\theta_{e1} \fallingdotseq 0.68\theta$
- △ $\theta_{e2} \fallingdotseq 0.58\theta$
- × $\theta_{e3} \fallingdotseq 0.48\theta$
- ○ $\theta_{e4} \fallingdotseq 0.38\theta$
- ▲ $\theta_{e5} \fallingdotseq 0.28\theta$

INTAKE SYSTEM FOR INTERNAL COMBUSTION ENGINES

BACKGROUND OF THE INVENTION

1. Field of the Invention

The present invention relates to an engine intake system, and more particularly to an engine intake system wherein a compression wave produced in the intake passage is utilized to increase the intake charge.

2. Description of the Prior Art

Hithertofore, it has been proposed to accomplish a high engine output by increasing the intake charge through a utilization of the inertia of the intake flow, the intake pressure resonance effect or the intake flow dynamic effect. In case where an increase in the intake charge is sought through a utilization of the pressure wave produced in the intake passage, several problems are encountered. One of such problems is that the pressure wave in the intake passage is weak under a low speed engine operation so that an adequate improvement cannot be achieved. Further, it is difficult to obtain improved results in increasing the intake charge through a broad engine operating range due to the fact that the compression wave propagates at the sonic speed but the engine speed changes in a wide range.

In view of the foregoing problems, Japanese patent application No. 54-12817 filed on Feb. 8, 1979 and disclosed for public inspection on Aug. 16, 1980 under the disclosure No. 55-107018 proposes an engine intake system including an intake air reservoir provided in the intake passage, and a control valve located in the intake passage between the reservoir and the intake valve. The control valve includes a valve disc which is rotated at a speed which is the same as or one-half of the speed of the engine crankshaft so that the communication between the reservoir and the cylinder is controlled is accordance with the engine speed.

In general, the engine speed N in which the intake charge can effectively increase through a utilization of the compression wave can be represented by the following formula (1).

$$N = \theta e v / 6 \quad (1)$$

wherein: $\theta e$ is the effective valve opening period in degree, and $v$ is the natural frequency in Hz of the intake system while the intake valve is open.

The effective valve opening period is defined as the period wherein the intake gas is actually drawn into the combustion chamber and does not exactly conform to the actual valve opening period. According to the teachings by the aforementioned Japanese patent application, the opening period of the control valve is controlled within the opening period of the intake valve so that the effective valve opening period corresponds to the opening period of the control valve. The Japanese patent application teaches to control the opening timing of the control valve in accordance with the engine speed to thereby change the timing in which the pressure wave is produced. The proposed intake system is therefore effective to a certain extent to expand the engine speed range in which the compression wave can be utilized to increase the intake charge.

It should however be noted that, in the proposed system, the opening period of the control valve is always within the opening period of the intake valve and the effective valve opening period $\theta e$ remains unchanged. Further, the natural frequency $v$ of the intake system does not change. Therefore, it is only possible within the opening period of the intake valve to expand the speed range in which the intake charge can be increased. Thus, the proposed system can perform an improvement only to a limited extent.

It should further be noted that the Japanese patent application teaches to retard the opening timing of the control valve in the low speed range so that the pressure wave can be intensified, however, this arrangement will cause an increase in the pumping loss. Thus, there will be an adverse effect on the fuel economy in light road engine operation. A further problem in the proposed system is that the effective valve opening period is determined essentially by the control valve which has the opening period smaller than that of the intake valve, so that the control valve produces an additional resistance to the intake flow. Therefore, it becomes difficult to ensure an adequate intake charge in a high speed, heavy load engine operation.

SUMMARY OF THE INVENTION

It is therefore an object of the present invention to provide an engine intake system in which the compression wave produced in the intake passage can be utilized to increase the intake charge throughout a wide engine operating range.

Another object of the present invention is to provide an engine intake system in which the intake charge can be increased without sacrificing other properties.

According to the present invention, the above and other objects can be accomplished by an intake system for an internal combustion engine comprising intake passage means leading to working chamber means of the engine, control valve means provided in said intake passage means for cyclically opening said intake passage means, reversing means provided in said intake passage means upstream said control valve means and spaced apart from said control valve means by a predetermined distance for reversing a negative pressure wave produced in the intake passage means when said control valve means is opened, timing control means for operating said control valve means synchronously with rotation of the engine and retarding opening timing of the control valve means so that the control valve means is opened after a top dead center of the working chamber means by a predetermined value at least in a low speed, high load engine operating range. The opening period of the control valve may be constant or changed continuously or stepwisely in accordance with the engine speed and/or engine load.

According to the features of the present invention, the opening timing of the control valve means is retarded under a low speed, high load engine operation so that the control valve means is opened later than the intake top dead center of the working chamber means. Thus, a strong negative pressure is produced in the intake passage means downstream the control valve means before the control valve means is opened. As soon as the control valve means is opened, the negative pressure propagates toward upstream side in the intake passage means and reversed at the reversing means to produce a positive pressure which is then transmitted toward downstream side and reaches the working chamber means at the end period of the intake stroke. It is therefore possible to accomplish a high intake charge.

Under a high speed engine operating range, the opening timing of the control valve means is advanced. Since the closing timing of the control valve means can be well after the end timing of the intake stroke, the advance in the opening timing of the control valve means causes an increase in the effective valve opening period. It is therefore possible to prevent any increase in the resistance to the intake flow under a high speed engine operation. By determining the natural frequency of the intake system so that a preferable result can be obtained in the high speed range, the dynamic effect of the intake system can be utilized for increasing the intake charge.

It is also preferable to make the control valve means ineffective under a light load operation because the control valve means can cause an increase in the pumping loss. According to the present invention, it is therefore possible to increase the intake charge under a wide engine operating range.

The above and other objects and features of the present invention will become apparent from the following descriptions of preferred embodiments taking reference to the accompanying drawings.

DESCRIPTION OF THE PREFERRED EMBODIMENTS

Figure 1:
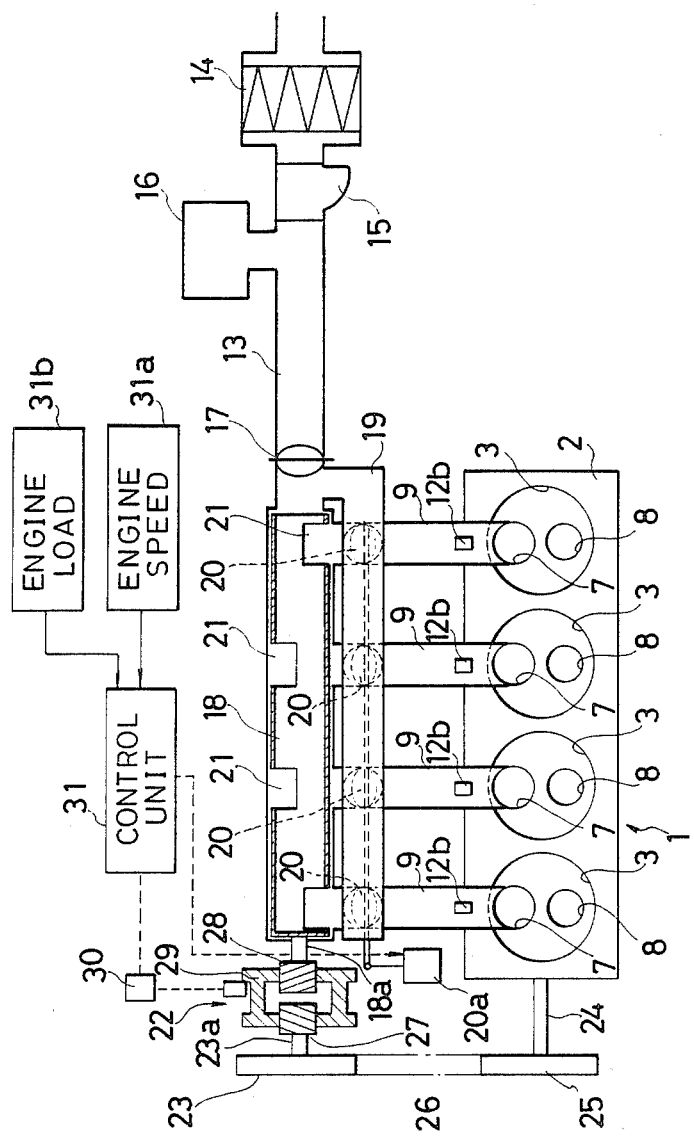
FIG. 1 is a diagrammatical top plan view of an engine in accordance with one embodiment of the present invention.
Figure 2:
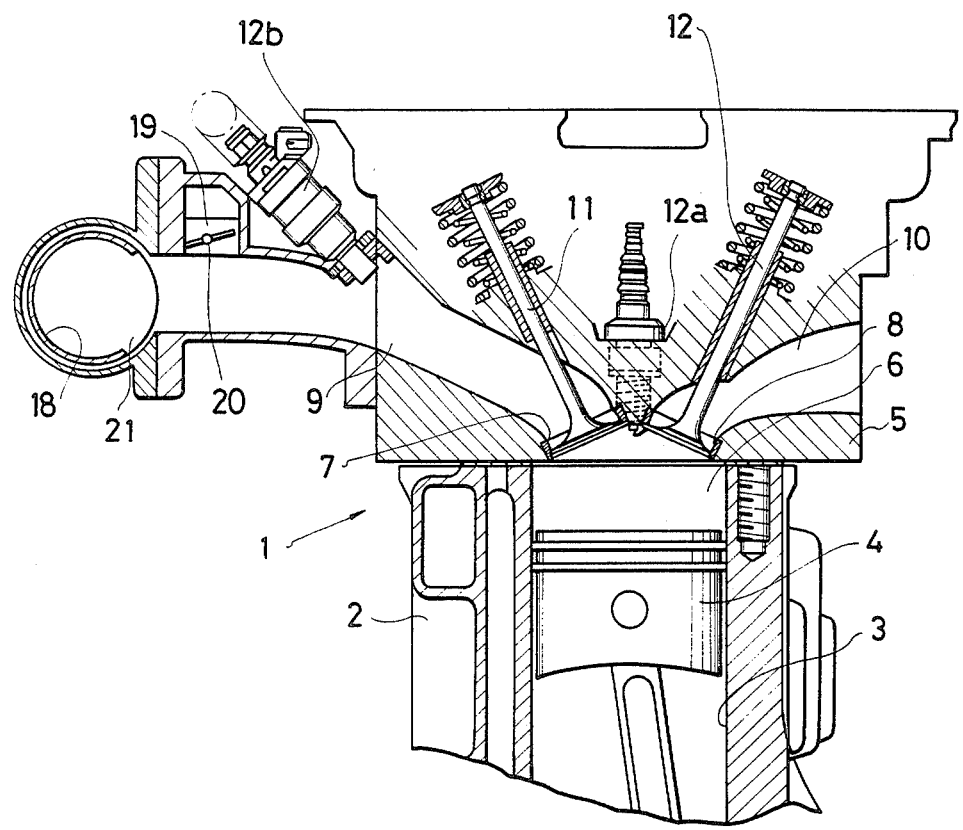
FIG. 2 is a vertical sectional view of the engine shown in FIG. 1.

Referring to the drawings, particularly to FIGS. 1 and 2, there is shown a four-cylinder engine 1 including a cylinder block 2 formed with four cylinder bores 3. In each of the cylinder bores 3, there is disposed a piston 4 for reciprocating movement. Above the cylinder block 2, there is a cylinder head 5 which is secured to the cylinder block 2. Thus, a combustion chamber 6 is defined in each cylinder bore 3 in the cylinder block 2.

The cylinder head 5 is formed with an intake port 7 and exhaust port 8 which open to each cylinder bore 3. The cylinder head 5 is further formed with an intake passage 9 and an exhaust passage 10 which respectively communicate with the intake port 7 and the exhaust port 8. The intake port 7 is provided with an intake valve 11 and the exhaust port 8 is provided with an exhaust valve 12. In the cylinder head 5, there is also provided an ignition plug 12a for each combustion chamber 6. A fuel injection valve 12b is provided in each intake passage 9. The intake passages 9 communicate with a main intake passage 13 which is provided at the upstream end with an air cleaner 14. Downstream the air cleaner 14, there are provided in this order an airflow meter 15 and a throttle valve 17.

The main intake passage 13 has an intake air tank 16 which provides the main intake passage 13 with an additional volume. Downstream the throttle valve 17, there is provided a rotary type control valve 18 which is specifically shown in FIG. 3. A bypass passage 19 is provided for connecting the main intake passage 13 downstream the throttle valve 17 with the individual intake passage 9 bypassing the control valve 18 as shown in FIG. 1. The bypass passage 19 has a bypass valve 20 for controlling the communication between the bypass passage 19 and the individual intake passages 9.

Figure 3:
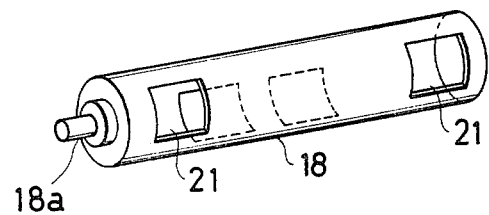
FIG. 3 is a perspective view showing the rotary type control valve.

As shown in FIG. 3, the rotary valve 18 is of a hollow cylindrical configuration having a cylindrical wall formed with openings 21 corresponding to the respective intake passages 9 so that the inside of the valve 18 is cyclically opened to the passages 9 at an appropriate timing as the valve 18 is rotated synchronously with the engine rotation. In the illustrated embodiment, the ignition takes place in the order of No. 1, No. 3, No. 4 and No. 2 cylinders so that the openings 21 for the No. 1 and No. 4 cylinders and the openings 21 for the No. 2 and No. 3 cylinders are located respectively at the same angular positions.

In FIG. 1, it will be noted that the rotary valve 18 has a drive shaft 18a which is connected through a timing mechanism 22 with a pulley 23. The engine 1 has an output shaft 24 which carries a driving pulley 25. An endless belt 26 is passed around the pulleys 23 and 25 so that a rotation of the engine output shaft 24 is transmitted to the pulley 23 and then through the timing mechanism 22 to the shaft 18a of the rotary valve 18 to drive the same. The pulleys 23 and 25 has the same diameter so that the rotary valve 18 is rotated at the same speed as the engine output shaft 24.

The timing mechanism 22 includes a helical gear 27 secured to the shaft 23a of the pulley 23 and a helical gear 28 secured to the shaft 18a of the rotary valve 18. The gears 27 and 28 are opposed to each other and an adjusting dog 29 is in meshing engagement with the helical gears 27 and 28. The rotation of the pulley 23 is therefore transmitted through the gear 27, the dog 29 and the gear 28 to the rotary valve 18. The dog 29 is displaceable in the axial direction and through such axial displacement, it is possible to change the angular phase of the gear 28 with respect to that of the gear 27. Thus, it is possible to control the opening timing of the control valve 18 by an axial displacement of the dog 29.

In order to determine the axial position of the adjusting dog 29, there is provided an actuator 30 which is of a type that is operated under the signal of an electronic control unit 31 preferably comprising a microprocessor. The control unit 31 receives an engine speed signal from a speed detector 31a and an engine load signal from a load detector 31b. The control unit 31 determines the opening timing of the control valve 18 and operates the actuator 30 so that the desired value opening timing is detained.

The bypass valve 20 is provided with an actuator 20a. The control unit 31 produces an output signal based on the engine speed signal and the engine load signal and makes the actuator 20a to operate so that the bypass valve 20 is opened under desired engine operating conditions.

Figure 4A:
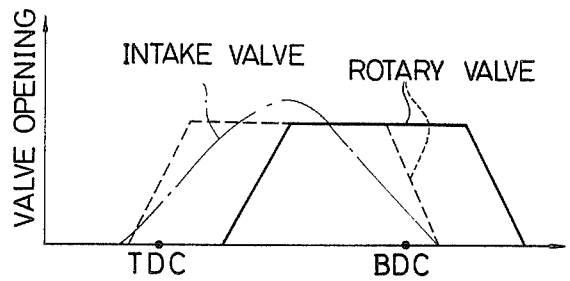
FIG. 4(a) is a diagram showing the valve timings.

Referring now to FIG. 4(a), the opening period of the rotary valve 18 is substantially the same as that of the intake valve 11. Under a high speed engine operation, the opening timing of the rotary valve 18 is substantially the same as that of the intake valve 11 so that the rotary valve 18 is opened substantially in the period wherein the intake valve 11 is opened as shown by dotted lines in FIG. 4(b). Under a low speed engine operation, however, the opening timing of the rotary valve 18 is retarded as shown by full lines so that the rotary valve 18 is opened after the intake top dead center. It will therefore be understood that, by the time when the control valve 18 is opened, a negative pressure is produced in the intake passage 9 downstream the control valve 18. As soon as the control valve 18 is opened, the negative pressure propagates through the main passage 13 to the position where the tank 16 is provided. At the tank 16, the negative pressure is reversed and a positive pressure is produced. The intake system is designed so that the positive pressure thus produced is transmitted to the intake port 7 at the end period of the intake stroke to increase the intake charge.

Since a strong positive pressure is produced at the tank 16 when a strong negative pressure is produced before the control valve 18 is opened, the opening timing of the control valve 18 is retarded so that it open after the intake top dead center under a low speed engine operation wherein the suction pressure is relatively weak. The illustrated intake system is further advantageous in that the effective valve opening period can be changed. Therefore, it is possible to accomplish an effective intake charge increase in a relatively wide engine operating speed range.

Figure 4B:
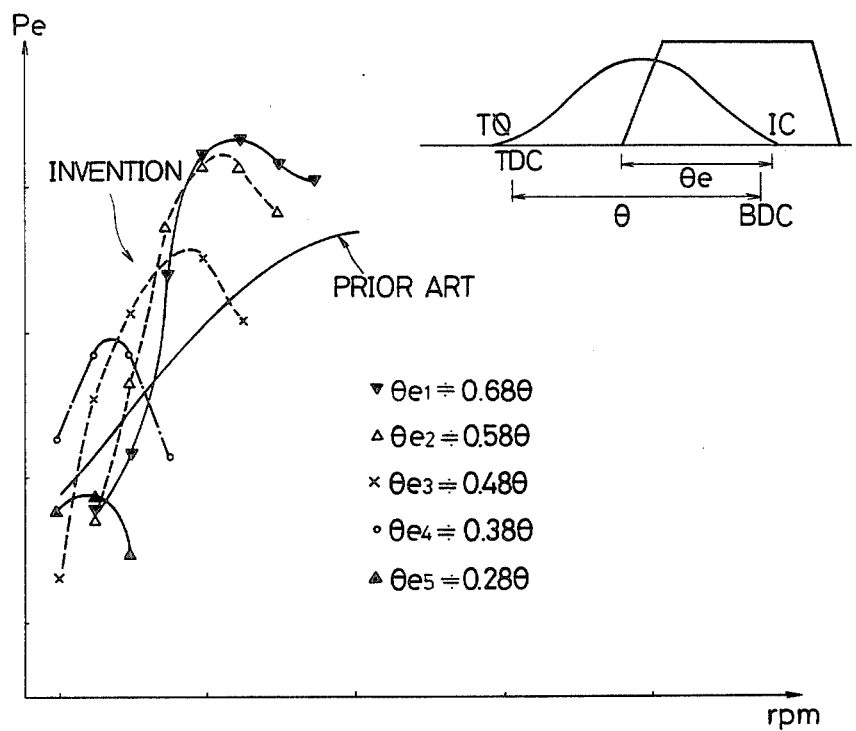
FIG. 4(b) is a diagram showing the relationship between the valve overlap $\theta e$ and the brake mean effective pressure.

Under a high speed, heavy load range, the actuator 20a is operated to open the bypass valve 20 so that the intake air is drawn not only through the control valve 18 but also through the bypass valve 20. This control will be effective to decrease the resistance to the intake flow so that an increased intake flow is obtained for the high speed, heavy load operation. It is of course advisable to open the bypass valve 20 under a low speed, light load operation. This will be effective to decrease the pumping loss. FIG. 4(b) shows the relationship between the valve overlap θe and the brake mean effective pressure Pe. It will be understood that, by properly determining the valve overlap, it is possible to obtain a significant increase in the engine output torque.

Figure 5:
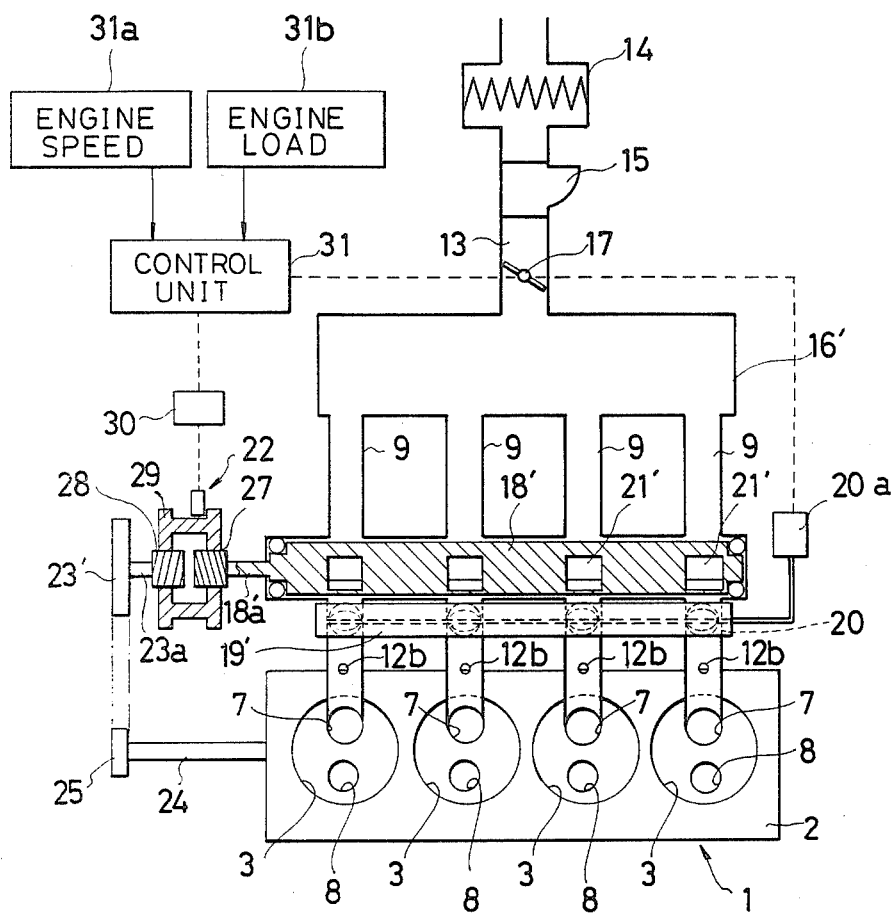
FIG. 5 is a view similar to FIG. 1 but showing another embodiment.
Figure 6:
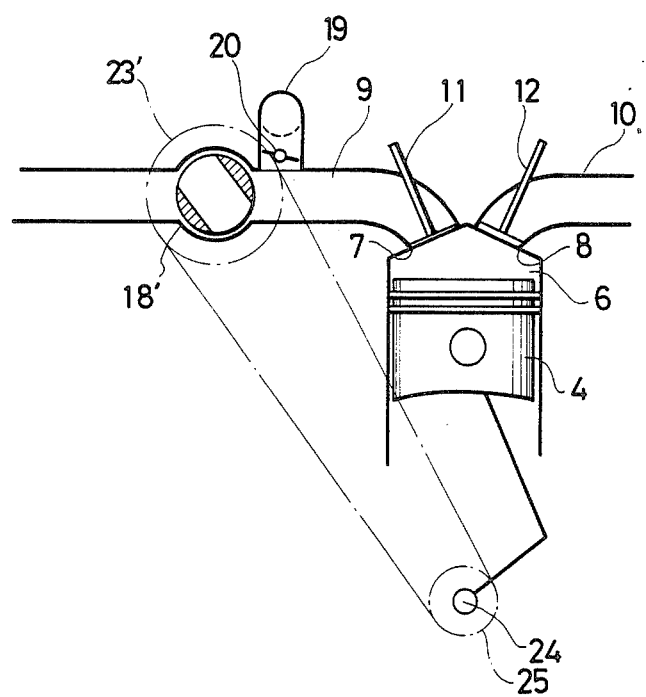
FIG. 6 is a vertical sectional view of the engine shown in FIG. 5.

Referring now to FIGS. 5 and 6, the embodiment shown therein includes a rotary valve 18' which is provided in the individual intake passages 9. There is further formed a negative wave reversing tank 16' between the main intake passage 13 and the individual intake passages 9. In this embodiment, the rotary valve 18' has diametrically extending openings 21' to cyclically open the passages 9. The valve 18' is rotated at a speed which is one-half the speed of the engine output shaft 24. Thus, the driven pulley 23' has a diameter which is two times as large as the drive pulley 25. A bypass passage 19 is provided to connect together the individual intake passages 9 and a bypass valve 20 is provided in the bypass passage 19.

Figure 7:
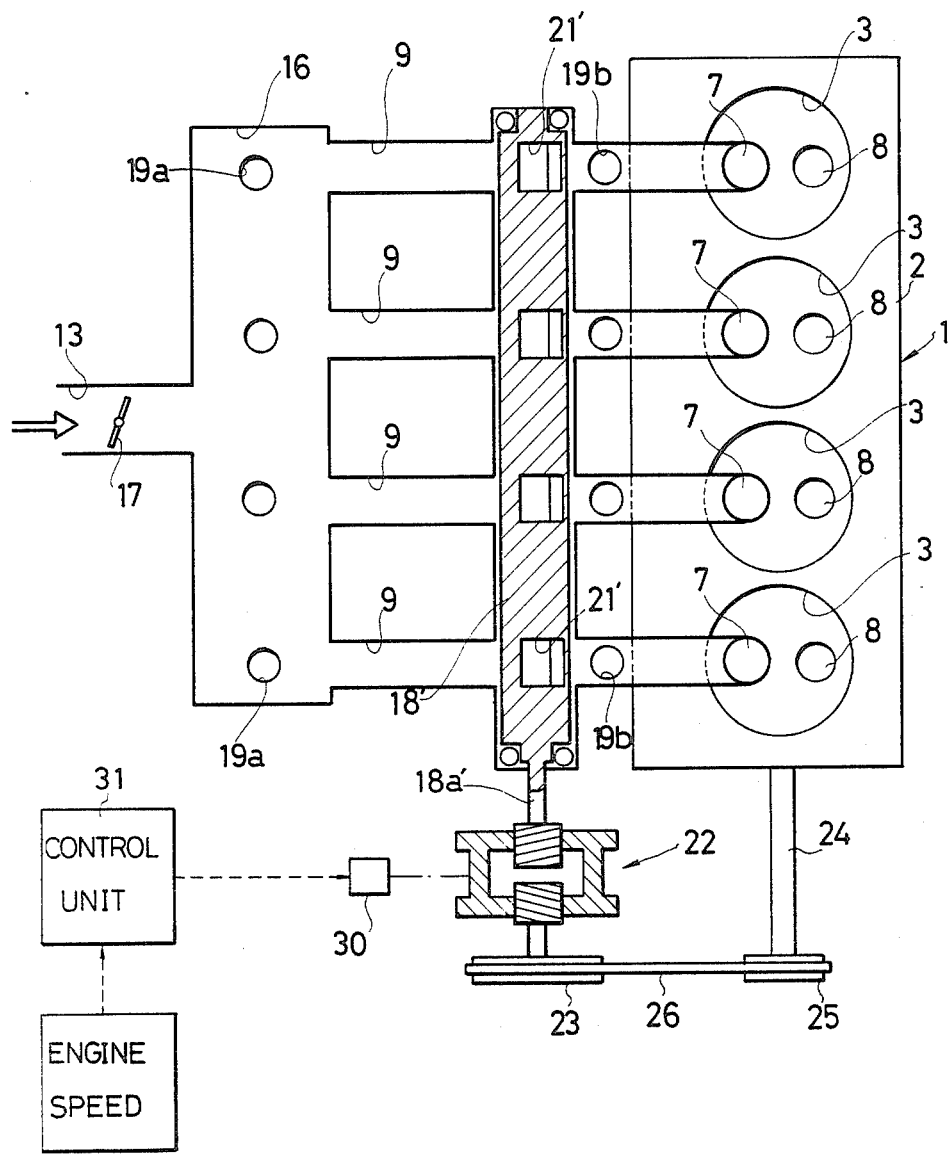
FIG. 7 is a view similar to FIG. 1 but showing a further embodiment.
Figure 8:
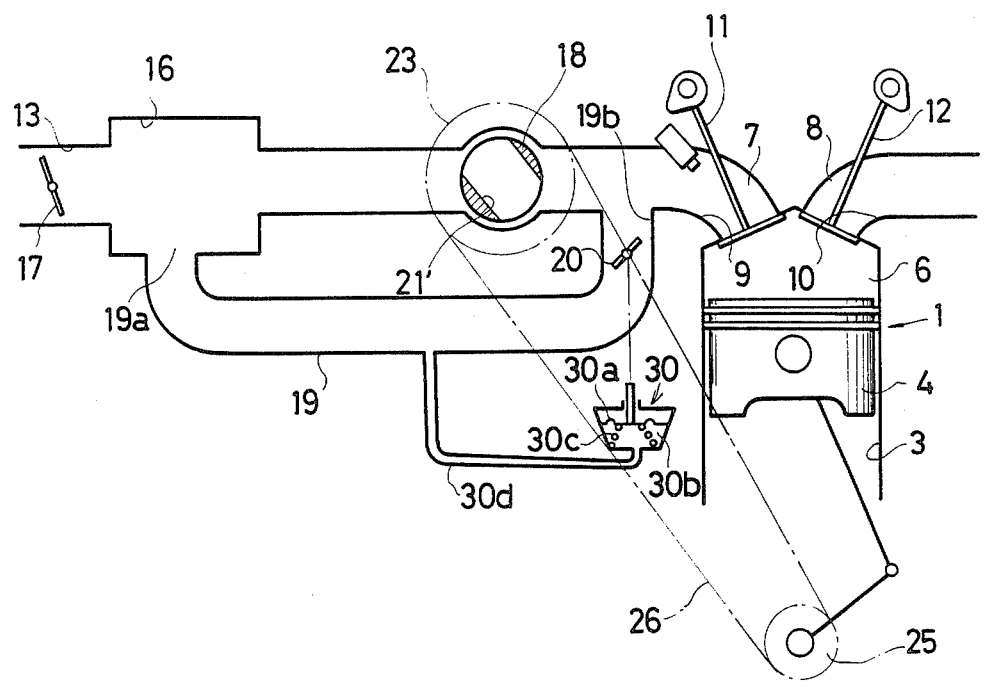
FIG. 8 is a vertical sectional view of the engine shown in FIG. 7.
Figure 9:
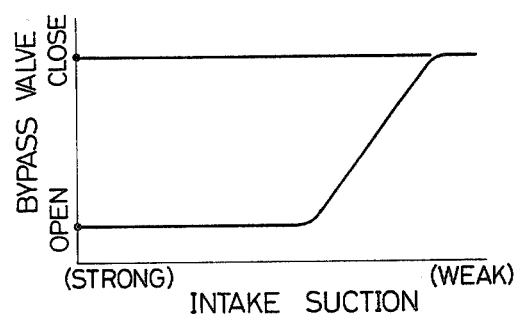
FIG. 9 is a diagram showing the relationship between the valve opening and the intake suction pressure; and, FIG. 10 is a top plan view of an engine in accordance with a further embodiment of the present invention.

Referring now to FIGS. 7 and 8, the engine shown therein includes a bypass passage 19 having an upstream end 19a opened to the tank 16. At the downstream side, the bypass passage 19 is branched and each of the branched passages is opened at the downstream end 19b to each individual intake passage 9. In each branch passage of the bypass passage 19, there is provided a bypass valve 20 which is adapted to be operated by a pneumatic actuator 30. The actuator 30 includes a diaphragm 30a connected with the valve 20. At one side of the diaphragm 30a, there is defined a suction pressure chamber 30b which is connected through a suction line 31 to the bypass passage 19. In the chamber 30b, there is a spring 30c which forces the diaphragm 30a in the direction of closing the valve 20. When a suction pressure is drawn into the chamber 30b, the diaphragm 30a is displaced to open the valve 20. The suction pressure is introduced into the chamber 30b from the tank 16 through the bypass passage 19 and the suction line 30d. As shown in FIG. 9, the valve 20 is closed when the suction pressure is weak but opened when the suction pressure is intensified beyond a predetermined level.

Figure 10:
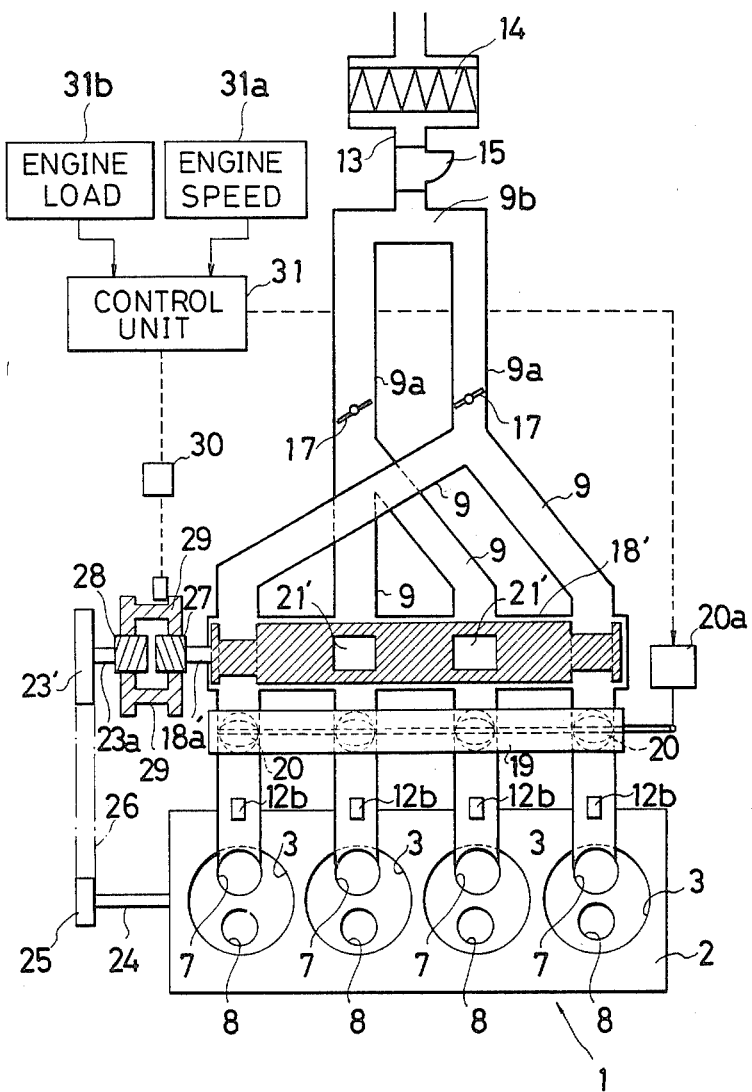

Referring to FIG. 10, the engine shown therein includes an intake system which is divided into two groups taking into consideration the order of ignition. The individual intake passages 9 for the No. 1 and No. 4 cylinders are connected with an intermediate passage 9a. Similarly, the individual intake passages for the No. 2 and No. 4 cylinders are connected with another intermediate passage 9a. The intermediate passages 9a are connected together by a manifold 9b which is in turn connected with a main intake passage 13. The passages 9a are respectively provided with throttle valves 17. In other respects, the arrangements are the same as in the embodiment shown in FIGS. 5 and 6. In this embodiment, the negative pressure in one intermediate passage 9a is different in phase by one-half of the cycle from the negative pressure in the other intermediate passage 9a. With this arrangement, it is also possible to reverse the negative pressure at the manifold 9b.

The invention has thus been shown and described with reference to specific embodiments, however, it should be noted that the invention is in no way limited to the details of the illustrated structures but changes and modifications may be made without departing from the scope of the appended claims.

What is claimed is:

1. An intake system for an internal combustion engine comprising working chamber means having a volume which changes cyclically between a top dead center of a smallest volume and a bottom dead center of a largest volume, intake passage means adapted to be cyclically opened to said working chamber means in an intake stroke which starts prior to said top dead center, control valve means provided in said intake passage means for closing said intake passage means so that intake air flow to said working chamber means is substantially interrupted and for cyclically opening said intake passage means, reversing means provided in said intake passage means upstream said control valve means and spaced apart from said control valve means by a predetermined distance for reversing a negative pressure wave produced in the intake passage means when said control valve means is opened, timing control means for operating said control valve means synchronously with rotation of the engine and retarding opening timing of the control valve means so that the control valve means is opened after top dead center of the working chamber means by a predetermined value in a first operating range including at least a low speed, high load engine operating range and the control valve means is opened at an advanced timing in a second operating range other than said first operating range so that the intake air flow is admitted to said working chamber means from said control valve means as soon as said intake stroke is started.

2. An intake system in accordance with claim 1 in which said reversing means is intake air reserving tank means.

3. An intake system in accordance with claim 1 in which said control valve means includes rotary valve means driven by an engine output shaft.

4. An intake system in accordance with claim 1 in which said timing control means includes phase adjusting means provided in driving means for transmitting an engine rotation to said control valve means for adjusting phasic relationship between an engine output shaft and the control valve means.

5. An intake system in accordance with claim 1 which further includes disabling means for making the control valve means ineffective under a high speed engine operation.

6. An intake system in accordance with claim 1 which further includes means for connecting communicating passage means with individual passages upstream the control valve means.

7. An intake system in accordance with claim 1 in which said timing control means includes means for retarding the opening timing of the control valve means in low speed engine operation.

8. An intake system in accordance with claim 7 which further includes disabling means for making the control valve means ineffective under a light load engine operation.

9. An intake system in accordance with claim 8 in which said disabling means is means for advancing opening timing of said control valve means under the light load engine operation.

10. An intake system in accordance with claim 8 in which said disabling means includes bypass passage means for bypassing said control valve means, bypass valve means provided in said bypass passage means for closing the same and valve control means for opening the bypass valve means under the light load engine operation.

11. An intake system in accordance with claim 10 in which said valve control means includes actuator means which is operated under an intake suction pressure to open the bypass passage means when the intake suction pressure is stronger than a predetermined value.

* * * * *